US009936080B2

(12) United States Patent
Macaluso (10) Patent No.: US 9,936,080 B2
(45) Date of Patent: Apr. 3, 2018

(54) ADVERTISING ON MOBILE DEVICES

(75) Inventor: Anthony G Macaluso, Rancho Santa Fe, CA (US)

(73) Assignee: SITO Mobile R&D IP, LLC, Jersey City, NJ (US)

(*) Notice: Subject to any disclaimer, the term of this patent is extended or adjusted under 35 U.S.C. 154(b) by 0 days.

(21) Appl. No.: 13/599,713

(22) Filed: Aug. 30, 2012

(65) Prior Publication Data

US 2013/0232008 A1 Sep. 5, 2013

Related U.S. Application Data

(63) Continuation of application No. 10/809,922, filed on Mar. 24, 2004, now abandoned.

(51) Int. Cl.
*G06Q 30/02* (2012.01)
*H04M 15/00* (2006.01)
*H04W 4/24* (2018.01)

(52) U.S. Cl.
CPC ......... *H04M 15/00* (2013.01); *G06Q 30/02* (2013.01); *G06Q 30/0267* (2013.01); *H04W 4/24* (2013.01); *H04M 2215/0192* (2013.01)

(58) Field of Classification Search
CPC .......... G06Q 30/02; G06Q 30/0267; G06Q 30/0277; G06Q 30/0269; G06Q 30/0239; G06Q 20/322; G06Q 30/0271; H04L 69/329; H04L 67/02; H04L 67/04; H04L 29/06; H04L 67/20; H04L 67/26; H04L 67/306
See application file for complete search history.

(56) References Cited

U.S. PATENT DOCUMENTS

| | | | | |
|---|---|---|---|---|
| 5,852,775 A * | 12/1998 | Hidary | ............... | H04L 12/1859 455/412.1 |
| 5,913,040 A * | 6/1999 | Rakavy et al. | ............... | 709/232 |
| 6,363,419 B1 * | 3/2002 | Martin et al. | ................. | 709/219 |
| 6,373,498 B1 * | 4/2002 | Abgrall | ......................... | 345/619 |
| 6,381,465 B1 * | 4/2002 | Chern et al. | ................. | 455/466 |
| 6,665,533 B1 * | 12/2003 | Sakoda | ...................... | 455/414.2 |
| 6,826,403 B1 * | 11/2004 | Minborg et al. | ............ | 455/445 |
| 6,826,614 B1 * | 11/2004 | Hanmann | ......... | G06F 17/30902 707/E17.12 |
| 6,996,394 B2 * | 2/2006 | Minear et al. | ............. | 455/412.1 |
| 7,027,802 B2 * | 4/2006 | Kim | .................. | H04M 1/72519 379/201.01 |
| 8,620,275 B2 * | 12/2013 | Minear et al. | ............. | 455/412.1 |
| 2001/0032193 A1 * | 10/2001 | Ferber | .............................. | 705/79 |
| 2001/0044742 A1 * | 11/2001 | Ko | ...................... | G06Q 30/0272 705/14.68 |
| 2002/0004855 A1 * | 1/2002 | Cox | ....................... | G06Q 30/02 719/328 |
| 2002/0128908 A1 * | 9/2002 | Levin et al. | .................... | 705/14 |
| 2002/0166127 A1 * | 11/2002 | Hamano et al. | .............. | 725/105 |

(Continued)

*Primary Examiner* — Matthew Sams
(74) *Attorney, Agent, or Firm* — Jim Stipek; Polsinelli PC (57) ABSTRACT

Techniques and systems for advertising on mobile devices allow advertisements to be presented on a mobile device during delay periods caused by wireless data communications. An advertisement may initially be stored on a mobile device. Subsequently, when a wireless data communication involving the mobile device is initiated, the advertisement may be presented on the mobile device during at least a portion of the wireless data communication.

61 Claims, 8 Drawing Sheets

(56) References Cited

U.S. PATENT DOCUMENTS

| | | | |
|---|---|---|---|
| 2002/0178051 A1* | 11/2002 | Golden | G06Q 20/045 705/14.39 |
| 2002/0196275 A1* | 12/2002 | Willner | G06Q 30/02 715/744 |
| 2003/0096625 A1* | 5/2003 | Lee et al. | 455/466 |
| 2003/0165130 A1* | 9/2003 | Wodzianek | G06F 9/45537 370/338 |
| 2003/0179229 A1* | 9/2003 | Van Erlach et al. | 345/744 |
| 2004/0003398 A1* | 1/2004 | Donian et al. | 725/34 |
| 2004/0117255 A1* | 6/2004 | Nemirofsky et al. | 705/14 |
| 2005/0131837 A1* | 6/2005 | Sanctis et al. | 705/64 |

\* cited by examiner

ADVERTISING ON MOBILE DEVICES

TECHNICAL FIELD

This description relates to mobile telecommunications, and more particularly to displaying advertising on mobile devices.

BACKGROUND

Voice communications is currently the primary service provided by wireless network operators. Capabilities for providing mobile wireless data communication services, however, are beginning to be deployed on a relatively widespread basis and are expected by many to represent a significant area of growth in the years ahead. Providing applications for use on mobile devices is one significant area of wireless data services. Such applications may include instant messaging, games, news, and productivity enhancement tools. Different strategies for providing such applications have emerged. Much of the initial development focused on server-side execution of applications in which most of the processing power resides in the network operator's, or a third party's, servers. This strategy was employed, for example, by the wireless application protocol (WAP), which uses WAP browsers to receive and display content and applications that are generated by remote servers. User responses are then sent back through the network to the remote servers for processing and any further actions. Thus, there can be significant delays as information is sent back and forth between the mobile device and the remote server.

As processors have become smaller and cheaper, along with cheaper and more compact memories, it has become more feasible to increase the processing power on the mobile device, which enables applications to be implemented locally on the mobile device. Sun Microsystem's Java technology, which is implemented on mobile phones as J2ME, offers one possible way of implementing applications on mobile devices. In addition, Qualcomm has developed the Binary Runtime Environment for Wireless (BREW) platform, which is described in further detail at http://www.qualcomm.com/brew. The Java and BREW technologies allow applications to be downloaded over the air and stored locally on a mobile device. This enables applications to run much faster and avoids many of the delays inherent in WAP technology. When downloading large applications and extensive amounts of content, however, there can still be delays that result from limited amounts of wireless bandwidth. Applications that comply with BREW development guidelines, for example, are required to provide some sort of status or progress dialogue (e.g., a pop-up window with a status bar showing percent complete, a hourglass icon, and the like) for the user if an operation such as downloading or connecting takes more than a few seconds.

SUMMARY

Techniques are described for delivering advertisements to mobile devices and displaying the advertisements on the mobile device during waiting times caused by delays in downloading of an application or content or caused by delays in obtaining a connection. The present inventor recognized that periods of delay while waiting for a download or connection to a mobile device could be leveraged to produce advertising income for wireless carriers and/or application providers. At the same time, the display of advertising may provide the user with a form of entertainment, especially as compared to watching a status or progress dialogue.

In one general aspect, advertising on a mobile device may be performed by storing an advertisement on a mobile device; initiating a wireless communication involving the mobile device; and presenting the advertisement on the mobile device during a portion of or during the entire the wireless communication.

Implementations may include one or more of the following features. For example, the advertisement may be downloaded to the mobile device over a wireless interface. The wireless communication may include a download of data to the mobile device. The download of data may involve data used by an application running on the mobile device. The application may be a Binary Runtime Environment for Wireless application. The download of data may involve an application file. The advertisement may be presented on the mobile device during a delay period that represents a time during which the download of data occurs. In some cases, a determination may be made that the stored advertisement has expired, and a notification of the expiration may be sent in response to the expiration determination. The expiration determination may be made by identifying expiration data associated with the advertisement and determining if the advertisement has expired based on the expiration data. The expiration data may relate to a number of times the advertisement is presented and/or an expiration time. The notification may represent a request for a new advertisement or a request for new expiration data and may be sent to a remote server. The determination that the stored advertisement has expired may be based on an expiration time and/or a number of times the advertisement is presented. The notification may represent a request for a new expiration time. A new advertisement may be received in response to the notification.

An expiration time for the new advertisement and/or an assigned number of times to present the new advertisement may also be received. The stored advertisement may include a bitmap, which may include multiple frames, and presenting the advertisement on the mobile device may involve sequentially displaying the frames. A number of times the stored advertisement is presented and/or a frequency that the stored advertisement is presented may be monitored. An indication of the wireless communication may be received by an advertising application from another application running on the mobile device, and the other application may initiate the wireless communication. The wireless communication may involve data needed by the other application to perform an operation requested by a user of the mobile device. The other application may run on a Binary Runtime Environment for Wireless platform. Statistical data relating to the advertisement may be maintained on the mobile device and/or at a remote server.

The techniques may be implemented as a method, in or by a system or apparatus, or as an article comprising a machine-readable medium storing instructions for causing one or more processors to perform the described operations.

In another general aspect, a communications system may include a wireless telecommunications network operable to support communications with mobile devices and a central advertising server in communication with the wireless telecommunication network. The central advertising server may be adapted to store advertisements for presentation on mobile devices during wireless data communications that cause a delay on the mobile devices. In addition, the central advertising server may be further adapted to receive a request for a new advertisement from an advertising application on a mobile device and determine whether one or more new advertisements are available. If at least one new advertisement is available, the central advertising server may be adapted to transmit a selected new advertisement to the mobile device.

Implementations may include one or more of the following features. For example, the central advertising server may be further adapted to track statistics relating to advertisements. The statistics relating to advertisements may include a number of times the advertisements have been presented on mobile devices, a number of presentations that have been assigned to mobile devices, a number of requested presentations for each advertisement, and/or an expiration time for each advertisement. The central advertising server may be further adapted to assign a number of presentations for the selected new advertisement and transmit the assigned number to the mobile device. The central advertising server may be further adapted to assign an expiration time for the selected new advertisement and transmit the assigned expiration time to the mobile device. The central advertising server may be further adapted to select the selected new advertisement according to a priority weighting procedure, which may relate to a remaining number of requested presentations for each advertisement and/or a time remaining until an expiration time for each advertisement. The central advertising server may be further adapted to determine if a new expiration time for a current advertisement is available if a new advertisement is not available and transmit a new expiration time for the current advertisement if a new expiration time for the current advertisement is available.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques may be provided for delivering advertisements to a mobile device and displaying or otherwise presenting the advertisements to a user of the mobile device. Although the techniques are described below primarily in the context of the BREW platform, the techniques are also applicable in connection with other platforms for supporting client-side application processing, such as Java and Motorola's iDEN technology, and in connection with implementations of server-side applications, such as applications that use WAP technology. One or more advertisements may be stored on a mobile device at any given time, and a process may be provided for determining which advertisement to display, when to delete an advertisement, when to download a new advertisement, and which advertisement(s) to download. The advertisements may be formatted as bitmaps and may include a single static frame or a series of frames that may be sequentially displayed to create an animated effect. The advertisements may additionally or alternatively include an audio component.

Figure 1:
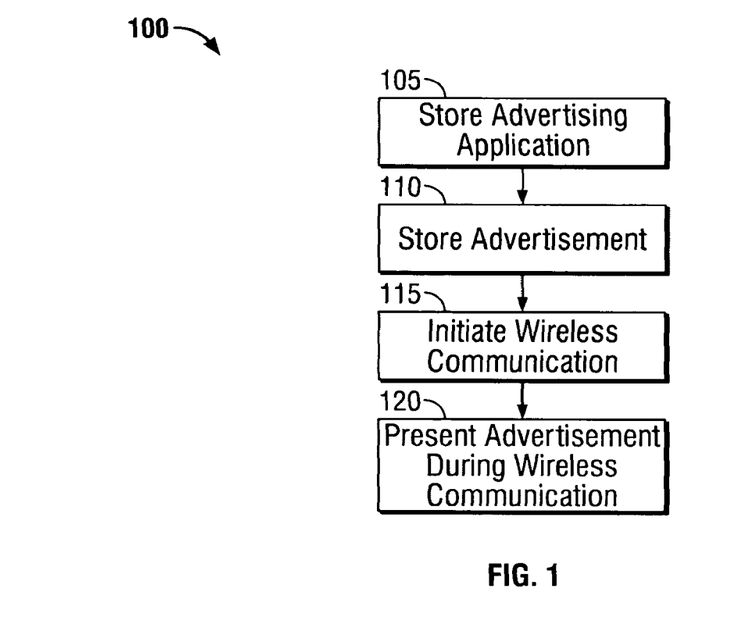
FIG. 1 is a flow diagram of a process for implementing an advertising routine on a mobile device.

FIG. 1 is a flow diagram of a process 100 for implementing an advertising routine on a mobile device. Initially, an application that supports a display of advertising on a mobile device is stored on the mobile device (step 105). The application may be stored on the mobile device at the time of manufacture or may be subsequently loaded onto the device, including through the use of an over the air downloading procedure. An advertisement is also stored on the mobile device (step 110). The advertisement may be stored in an erasable memory such that the advertisement may be overwritten with other data. For example, after a specified time period, the advertisement may be replaced with a new advertisement. In some implementations, more than one advertisement may be stored so that a rotation of several different advertisements can be presented to a user of the mobile device.

A wireless data communication is initiated between the mobile device and a remote server (step 115). The data communication may represent, for example, a download of an application or content from the remote server to the mobile device. During the wireless data communication, an advertisement is presented on the mobile device by the advertising application (step 120). The advertisement may be presented for a specified period or may remain on the screen until the data communication is complete. The advertisement may be presented to the user in lieu of or in addition to some type of status or progress dialogue that relates to the status or progress of making a connection and performing the data communication. Generally, the advertisement is stored on the mobile device prior to the initiation of the wireless data communication, although in some situations and in some implementations, an advertisement may be downloaded onto the mobile device as part of the wireless data communication.

Figure 2:
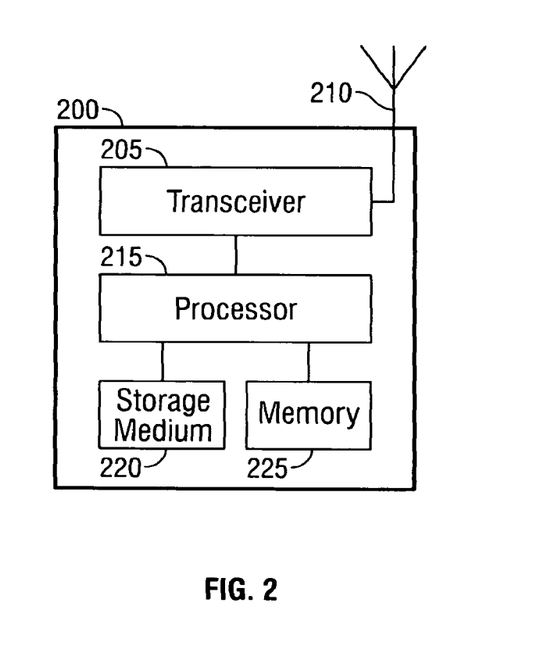
FIG. 2 is a block diagram of a mobile phone that may be used in connection with the described techniques.

FIG. 2 is a block diagram of a mobile phone 200 that may be used in connection with the described techniques. The mobile phone 200 includes a transceiver 205 connected to an antenna 210 for communicating voice and data to and from a remote server, wireline telephone connection, and/or another mobile device through a wireless communication system in accordance with conventional techniques. For example, the wireless communication system may be a CDMA, GSM, or UMTS network, or any other type of mobile network. The transceiver 205 is connected to a processor 215 that controls the operation of the mobile phone 200, including the operation of the transceiver 205. A storage medium 220, which may be removable, read-only, or read/write media and may be magnetic-based, optical-based, semiconductor-based media, or a combination of these, may store operating system software for the mobile phone 200. A memory 225 may store additional, less vital information, such as applications that may be loaded into the mobile phone 200, including an application for displaying advertisements on the mobile phone 200. In addition, a cache containing one or more advertisements may be stored in the memory 225. Both the memory 225 and the storage medium 220 are connected to the processor 215. The processor 215 may operate in accordance with software, applications, or other instructions stored in the memory 225 and/or the storage medium 220.

Applications stored on the mobile phone 200, such as the advertising application, may be written in Java code, C/C++ code, in accordance with a Binary Runtime Environment for Wireless (BREW) Software Development Kit (SDK), or some other appropriate format. The storage medium 220 in the mobile phone 200 may include a Java virtual machine. Alternatively or in addition, the storage medium 220 may include BREW client software. The BREW platform, which was developed by Qualcomm and is described in greater detail at "www.qualcomm.com/brew," enables Java and BREW applications to be easily downloaded onto and executed on the mobile phone 200. As another alternative, the storage medium 220 may include software for implementing Motorola's iDEN technology. In general, a Java virtual machine may be run on top of the BREW client or iDEN technology to support Java applications/applets, and other types of extensions may be run on top of the BREW client to support other types of applications. Applications, such as the advertising application mentioned above, may therefore be easily loaded onto the mobile phone 200.

Figure 3:
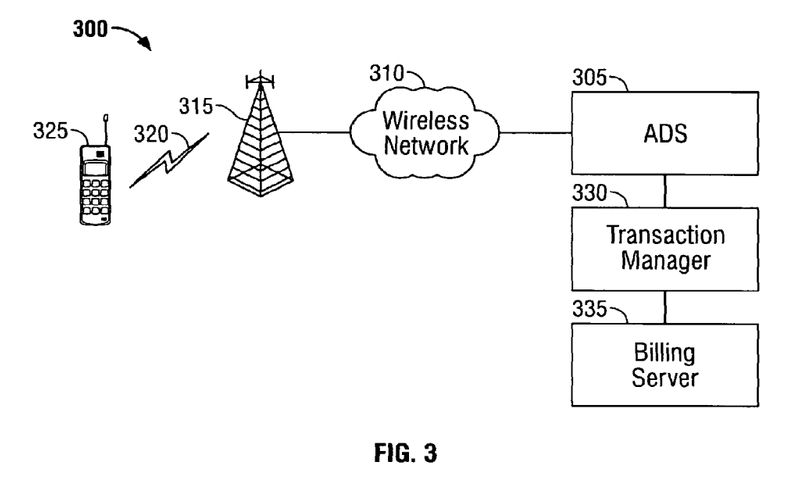
FIG. 3 is a block diagram of a system for supporting a BREW solution.

FIG. 3 is a block diagram of a system 300 for supporting a BREW solution. A BREW, Java, or other BREW-compatible application may be stored on an application download server (ADS) 305 and may be downloaded from the ADS 305, through a wireless network 310, and to a base station 315 in the vicinity of a mobile phone 325 for which the application is intended. The base station 315 may in turn transmit the application over a wireless communication link 320 to the mobile phone 325. When an application is downloaded from the ADS 305, the ADS 305 collects application download event information and sends it to a transaction manager 330. The transaction manager 330 combines the download event information with other information, such as application pricing structure and developer data for the downloaded application, to produce usage records. The transaction manager 330 sends the usage records to a billing server 335, which may perform billing services, such as generating invoices. In addition, the billing server 335 may allow an application developer, a carrier, and/or a third party associated with the ADS 305 to run a report and find out how many users are subscribing to a particular service offering or application on an up-to-the-minute basis.

The ADS 305 may be associated with a particular operator or with a third party. The ADS 305 may store applications and data for downloading to mobile devices, including an application that, when loaded on a client mobile device, allows the display of advertising and advertisements that may be displayed or otherwise presented on the mobile device using the advertising application. In one possible implementation, the advertising application may be a BREW extension that can be used by developers of other applications. Implementing the advertising application as a BREW extension may allow the advertising application to work with any BREW application. For example, a service provider or mobile communication system operator may want to require application developers to enable use of the advertising extension in return for offering the developers' applications in connection with a particular mobile communication service. This would allow the service provider or mobile communication system operator to derive revenue by selling advertising space on mobile devices. By displaying advertisements on a mobile device, especially during a data communication that is initiated by the user (e.g., a download of a new application or a download of application-related content), such advertisements are likely to be viewed by the user.

The ADS 305 may also store advertisements for downloading to the mobile phone 325 as well as other applications, which may be developed by the operator of the ADS 305, by one or more carriers, and/or by third party developers. One possible application, for example, would allow users to browse and select other applications to be downloaded. It is possible that the ADS 305 may offer only pass-through access to certain carrier and/or third party applications, such that the applications are stored and managed on a server associated with the carrier or third party. In some implementations, however, most or all of the available applications may be stored and managed on the ADS 305. The operator of the ADS 305 may have agreements with the carriers or other third party developers to offer the applications and to provide for payment to the carriers or other third party developers.

In general, the advertising application, once installed on the mobile device, operates to present advertisements stored on the mobile device to a user of the mobile device when the mobile device is in the process of connecting to a remote server and/or downloading another application or application-related content to the mobile device, particularly when such a data communication causes a noticeable delay (i.e., more than a second or two). Rather than simply displaying a status dialogue, an application that is running on the mobile device may send a function call to the advertising application or extension. The advertising application may then display an advertisement and possibly other information. For example, a display screen on the mobile device may display two bitmap sections and a text section. One bitmap section may display the advertisement, while the second bitmap section and the text section may be specified by the calling application.

Figure 4:
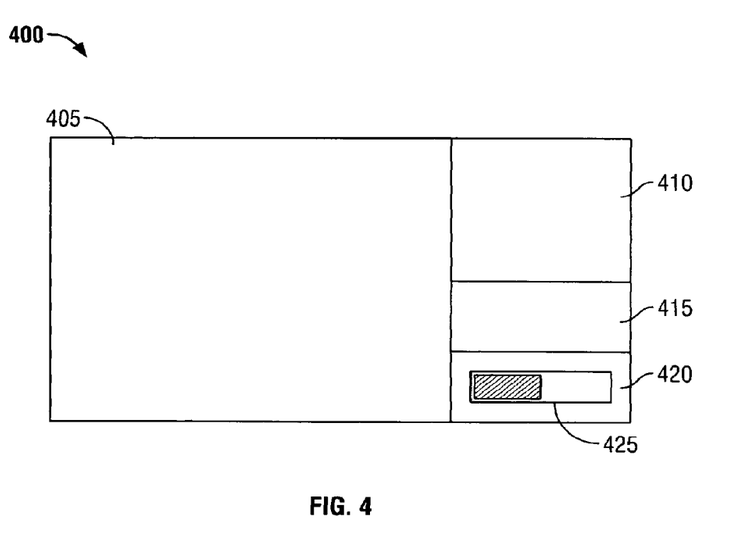
FIG. 4 shows an illustrative representation of a display screen on a mobile device for displaying an advertisement.

FIG. 4 shows an illustrative representation of a display screen 400 on a mobile device for displaying an advertisement. The display screen 400 includes a first bitmap section 405 for displaying an advertisement bitmap or a sequence of advertisement bitmaps and a second bitmap section 410 for displaying a bitmap specified by the application that is involved in a wireless communication. For example, the second bitmap section 410 may display a graphic that relates to information being downloaded. Similarly, a text section 415 may display text that is specified by the application involved in a wireless communication, such as text describing the content being downloaded, the expected amount of time remaining to complete the download, the percent complete, and/or that a download or other wireless communication is ongoing. The display screen 400 may further include a progress section 420 for indicating the progress 425 of the wireless communication, especially in cases where this information is not provided in the text section 415.

The advertising application may also manage and maintain a cache of one or more advertisements. In addition to a cache of downloadable advertisements, the advertising application may include a default advertisement that is never deleted. The advertising application may track the respective advertisments' lifetimes. For example, it may be desirable for advertisements to have a specified expiration date and time and/or a specified number of times to be displayed. The advertising application may also keep track of statistics relating to the advertisement, such as the number of times displayed and frequency of display. Once the expiration date is reached or the advertisement has been displayed the specified number of times, the advertising application may negotiate with a server that stores a library of advertisements to obtain a new advertisement to replace the expired advertisement. In cases where the cache stores more than one advertisement, the advertisement that is displayed may be selected randomly, selected in accordance with a predetermined order (e.g., the order in which the advertisements were loaded onto the mobile device), selected in accordance with some type of weighting algorithm (e.g., where some advertisements may be selected more frequently than others), or selected based on the calling application or the type of information being downloaded (i.e., the advertisement may relate to the subject matter of the wireless data communication during which the advertisement is displayed). Similarly, the advertisements that are downloaded to the mobile device may be selected in accordance with similar criteria (i.e., random selection, a predetermined order, a weighting algorithm, or based on the subject matter of the underlying data communication).

Figure 5:
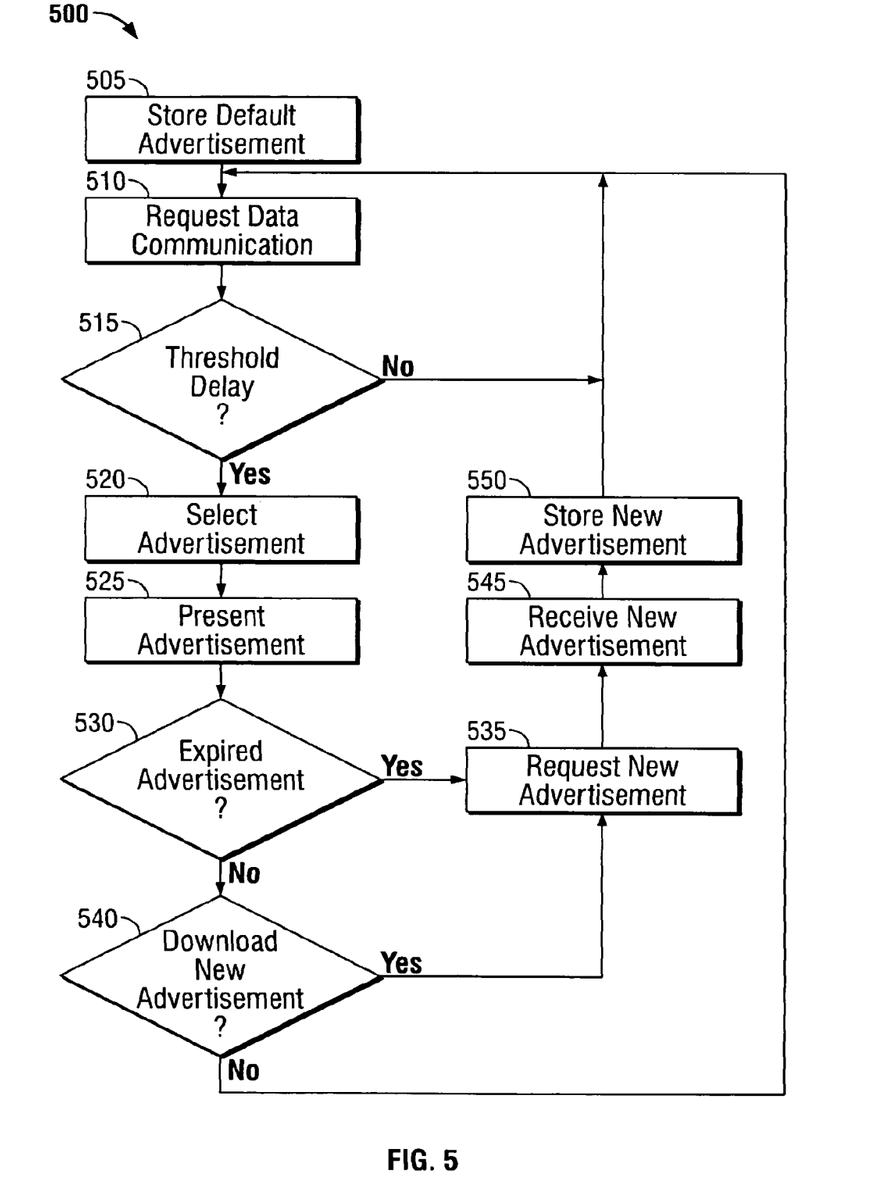
FIG. 5 is a flow diagram of a process for managing advertisements on a mobile device.

FIG. 5 is a flow diagram of a process 500 for managing advertisements on a mobile device. The process 500 may be implemented, for example, as an application or extension on the mobile device. A default advertisement is stored on the mobile device (step 505). The default advertisement may be included as part of an advertising application. In some implementations, however, a default advertisement may be optional. An application running on the mobile device may initiate a request for a data communication (step 510), such as a download of another application or application-related content. The request for a data communication might also be initiated by a remote server and received by the mobile device. A decision may be made as to whether the data communication is likely to require more than a threshold amount of time (step 515). If the delay is likely to be short, it may be desirable not to present an advertisement, and the process 500 may wait for the next data communication request. If the delay is sufficiently long, however, it may be desirable to present an advertisement on the mobile device during the data communication.

If an advertisement is to be displayed, an advertisement may be selected (step 520). Initially, the only available advertisement may be the default advertisement. In addition, even after other advertisements have been downloaded into an advertisement cache on the mobile device, the default advertisement may be the only available advertisement if the other advertisements have all expired or been deleted. If one or more advertisements are available in the advertisement cache, a particular advertisement may be selected from the available advertisements in accordance with any desired selection criteria. The selected advertisement is displayed or otherwise presented (step 525).

During the display of the selected advertisement and/or the underlying data communication, a determination may be made as to whether the selected advertisement (and/or any other advertisements in the advertisement cache) has expired (step 530). Each advertisement may have an associated expiration date and time that is assigned to and downloaded with the advertisement. If the date and time have passed, the advertisement may be considered to have expired. If the advertisement has expired, a new advertisement may be requested (step 535) by, for example, sending a request to a remote server that stores a library of advertisements. Even if the current advertisement has not expired, there may be instances in which it may be desirable to download a new advertisement. Accordingly, a determination may be made as to whether a new advertisement should be downloaded (step 540). If so, a new advertisement may be requested (step 535). If not, the process 500 may wait for the next data communication request.

If a new advertisement is requested at step 535, the new advertisement may be received (step 545) and stored in the advertisement cache (step 550), after which the process 500 may wait for the next data communication request. The new advertisement may be received as part of the underlying data communication or may be sent during a separate data communication. If the new advertisement is sent as part of the underlying data communication, however, the number of connections to the network may be minimized.

The process 500 is illustrated and described as performing a check for expired advertisements, determining whether to download a new advertisement, and requesting a new advertisement after displaying a selected advertisement. In some implementations, however, it may be desirable to download the new advertisement before selecting and displaying an advertisement. Accordingly, the new advertisement may be downloaded at the beginning of the underlying data communication. The process 500 may also be rearranged and performed in a number of different sequences. Regardless of whether new advertisements are downloaded before or after the underlying data communication, it is generally desirable to limit the amount of time required to download advertisements. It may also be desirable to limit the amount of storage space used by the advertisement on the mobile device. Accordingly, the bitmap and/or any other components of the advertisements may be subject to size limitations. Advertisements may also be compressed to reduce the size of the file that needs to be downloaded.

Figure 6:
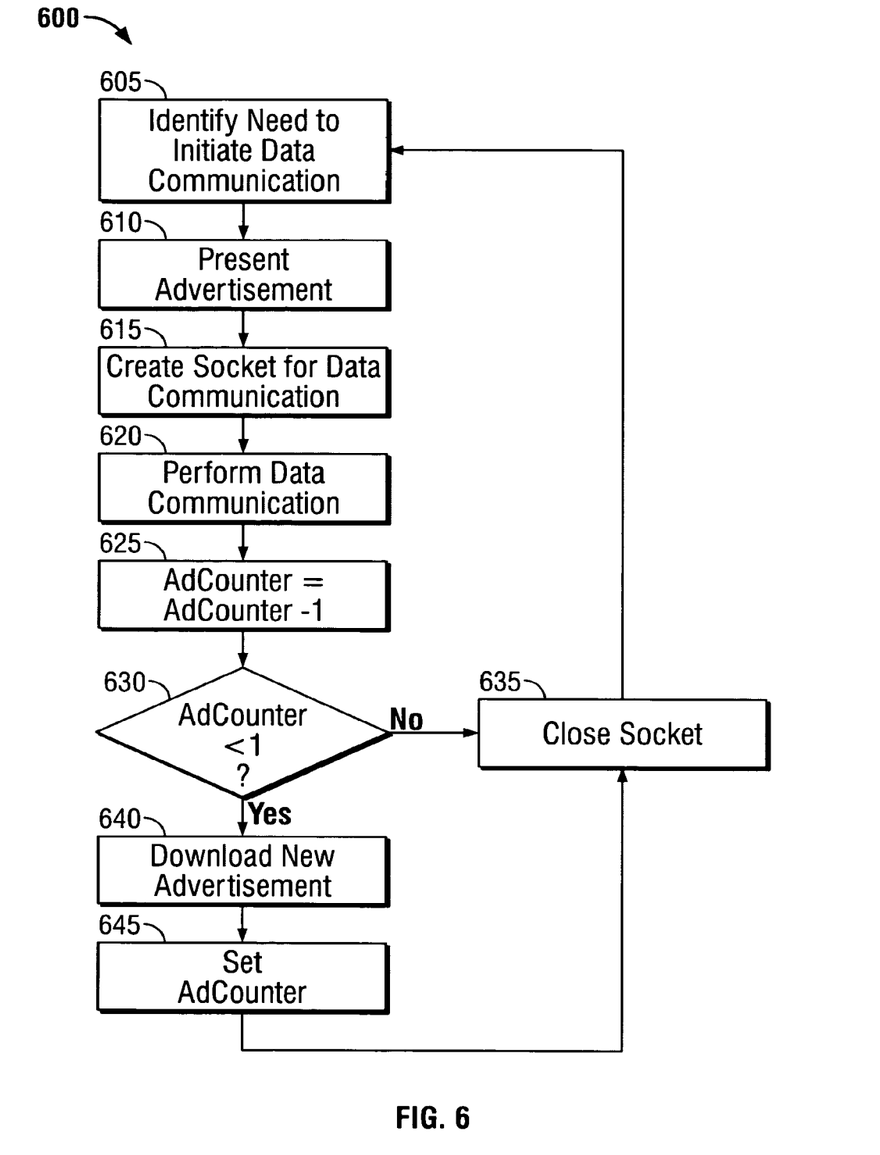
FIG. 6 is a flow diagram of an alternative process for managing advertisements on a mobile device.

FIG. 6 is a flow diagram of an alternative process 600 for managing advertisements on a mobile device. The process 600 illustrates one example of a sequence of performing the underlying data communication and the advertisement management and downloading. In addition, while the process 500 of FIG. 5 uses expiration data to determine when to delete a particular advertisement and download a new advertisement, the process 600 of FIG. 6 uses a counter of the number of times an advertisement is displayed. When a new advertisement is downloaded, an AdCounter value representing the number of times the advertisement is to be displayed may also be sent with the advertisement. The use of expiration data and a counter value are not necessarily mutually exclusive. In some implementations, it may be desirable to use both techniques for determining whether a new advertisement should be downloaded. For example, a new advertisement may be downloaded in connection with the earlier of the expiration date or the advertisement having been displayed a specified number of times.

The process 600 includes an identification of a need to initiate a data communication (step 605). In response to this identification, an advertisement is displayed (step 610). Generally, the advertisement continues to be displayed until the data communication is complete. Approximately concurrently with initiating the display of the advertisement, a socket is created for the data communication (step 615), and the data communication is performed using the socket (step 620). The AdCounter associated with the displayed advertisement is decremented by one (step 625), indicating that the advertisement has been displayed one additional time. Next, a determination is made as to whether the value of the AdCounter is less than one (step 630). If not, the socket is closed (step 635), and the process 600 waits for the next data communication at step 605.

If the AdCounter is less than one, then the advertisement has been displayed the specified number of times, and, thus, a new advertisement is needed. Accordingly, a new advertisement is downloaded (step 640), and the AdCounter associated with the new advertisement is set to a value indicating the number of times the advertisement is to be displayed (step 645). The socket is then closed at step 635, and the process 600 waits for the next data communication at step 605. Again, the sequence of steps in the process 600 may be rearranged. For example, steps 630, 640, and 645 may be performed after step 615 but before step 620.

Figure 7:
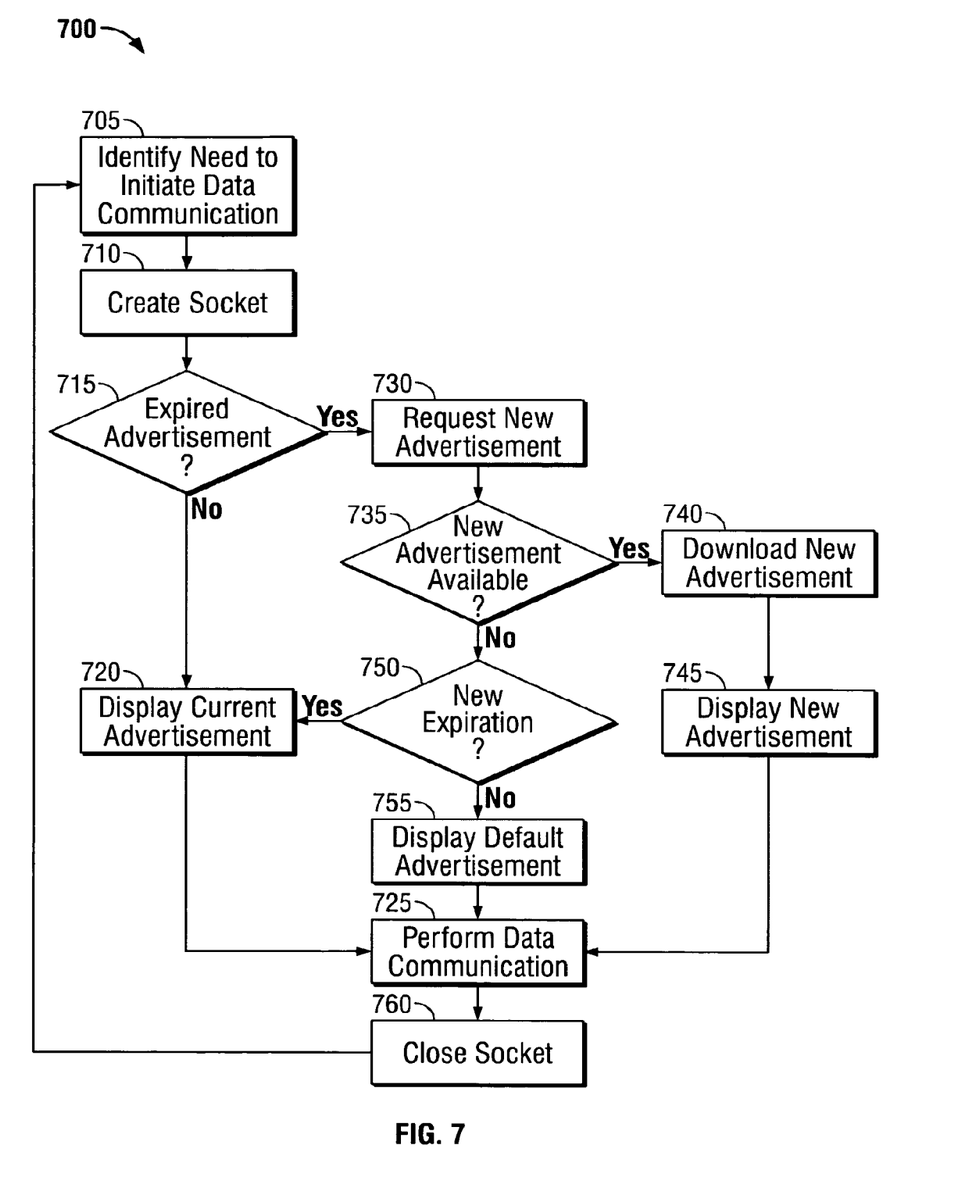
FIG. 7 is a flow diagram of another alternative process for managing advertisements on a mobile device.

FIG. 7 is a flow diagram of another alternative process 700 for managing advertisements on a mobile device. In some cases, a new advertisement may not be available when a mobile device requests a new advertisement from a central server. In such a case, the mobile device may be provided with a new expiration date for an existing advertisement. FIG. 7 illustrates a process 700 that allows a new expiration date to be provided as an alternative to downloading a new advertisement. The techniques (and elements thereof) described in connection with and depicted in FIG. 7 may also be combined with and/or substituted for other described techniques.

The process 700 includes an identification of a need to initiate a data communication (step 705). A socket is created for the data communication (step 710), and a determination is made as to whether a current advertisement stored in an advertisement cache has expired (step 715). If not, the current advertisement is displayed (step 720), and the data communication is performed (step 725). If the current advertisement is expired, a new advertisement is requested (step 730).

A determination is then made regarding whether a new advertisement is available (step 735). If so, the new advertisement is downloaded (step 740), the new advertisement is displayed (step 745), and the data communication is performed (step 725). If a new advertisement is not available, it is determined whether a new expiration for the current advertisement is available (step 750). If so, the current advertisement is displayed (step 720), and the data communication is performed (step 725). If a new expiration for the current advertisement is not available, a default advertisement (or a different advertisement stored in the advertisement cache) is displayed (step 755), and the data communication is performed (step 725). Once the data communication is complete, the socket is closed (step 760), and the process 700 waits for the next data communication at step 705. As with the previous processes 400 and 500, the sequence of steps in the process 700 of FIG. 7 may be rearranged.

The advertising application may be implemented as one or more extensions that are called by other applications that run on a mobile device. When a developer produces a new application, the application may incorporate function calls to the one or more extensions. In one possible implementation, an advertising extension may provide two public functions, a progress function and an update function. The progress function may control the display of an advertisement and maintain an update flag (or an update counter) that controls whether a new advertisement download may be necessary. The update function may allow the application developer to control when advertisement downloads occur (e.g., immediately after creating a socket or immediately before closing the socket).

Figure 8A:
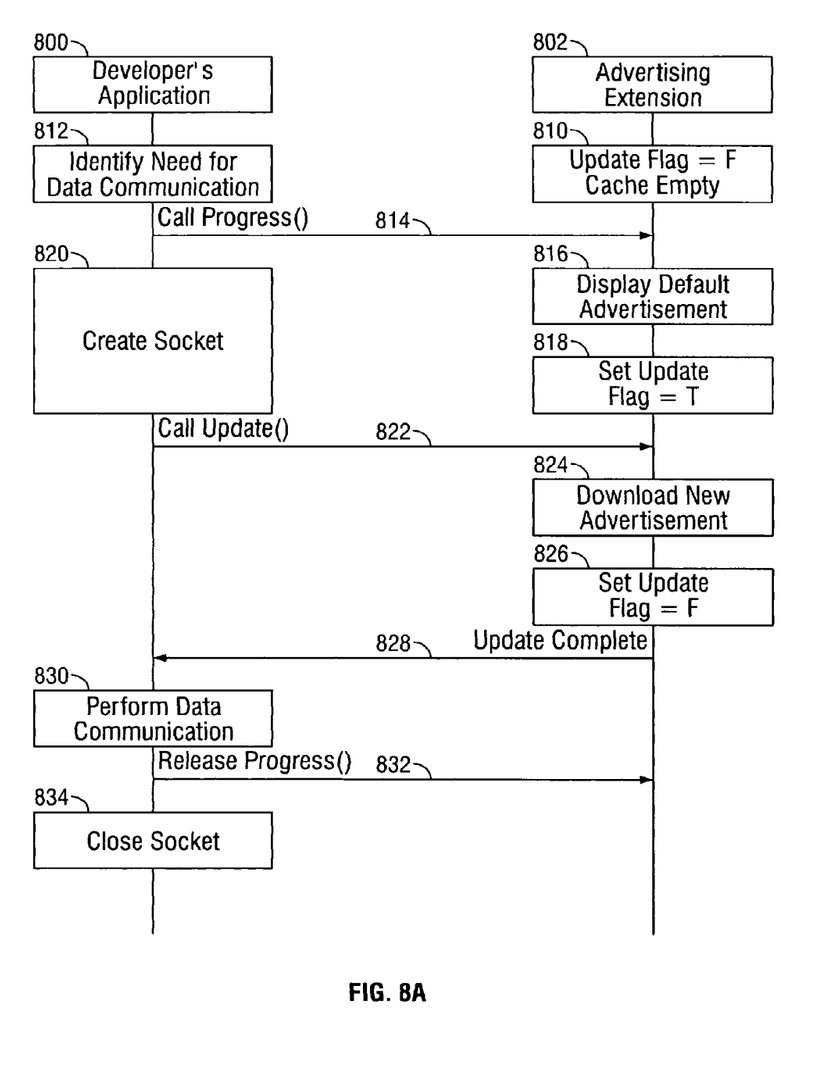
FIGS. 8A and 8B are signaling and flow diagrams of the interaction between a developer's application and an advertising application installed on a mobile device.
Figure 8B:
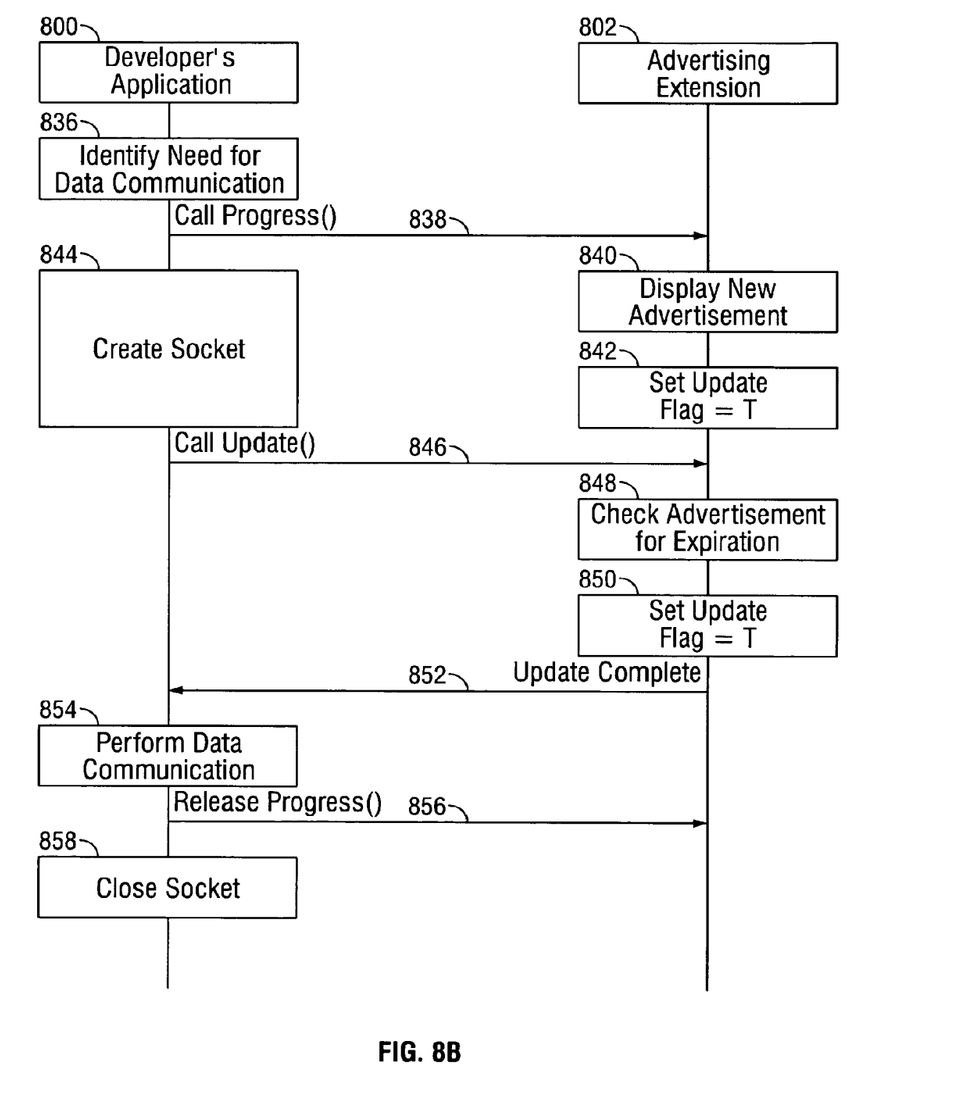

FIGS. 8A and 8B are signaling and flow diagrams of the interaction between a developer's application 800 and an advertising application 802 installed on a mobile device. Initially, no advertisements have been downloaded onto the mobile device. Thus, only the default advertisement is stored on the mobile device. The advertising extension 802 maintains status information relating to the advertisements stored on the mobile device. This status information includes an update flag and an indication of whether an advertisement is stored in an advertisement cache of the mobile device, which are set to respective initial values (step 810). The initial value of the cache is empty and the initial value of the update flag is false, indicating that the default advertisement (or current advertisement in the advertisement cache) can be displayed at least one more time before a new advertisement may need to be downloaded.

The developer's application 800 identifies a need to initiate a data communication (step 812), and in response, initiates a call 814 to the progress function of the advertising extension 802. In response to the progress call 814, the advertising extension 802 displays the default advertisement (step 816) and sets the update flag to true (step 818). Each time the advertising extension displays an advertisement, it will set the update flag to true. Concurrent with the display of the default advertisement, the developer's application 800 creates a socket (step 820) for conducting the data communication. The developer's application 800 then initiates a call 822 to the update function of the advertising extension 802. In response to the update call 822, the advertising extension 802 determines that a new advertisement needs to be downloaded because the update flag is set to true and the cache does not contain an advertisement. As a result, the advertising extension 802 downloads a new advertisement (step 824), stores the new advertisement in the cache, and sets the update flag to false (step 826).

The advertising extension 802 sends a message 828 to the developer's application 800 indicating that the update procedure is complete. The developer's application 800 then performs the data communication (step 830) (i.e., with a remote server) and, upon completion of the data communication, sends a message 832 releasing the progress function, which informs the advertising extension 802 when to stop displaying the advertisement. The developer's application 800 closes the socket (step 834).

Subsequently, as shown in FIG. 8B, the developer's application 800 identifies a need to initiate another data communication (step 836), and in response, initiates a call 838 to the progress function of the advertising extension 802. In response to the progress call 838, the advertising extension 802 displays the new advertisement (step 840) and sets the update flag to true (step 842). Concurrent with the display of the default advertisement, the developer's application 800 creates a socket (step 844) for conducting the data communication. The developer's application 800 then initiates a call 846 to the update function of the advertising extension 802. In response to the update call 846, the advertising extension 802 checks the new advertisement for expiration (step 848). Assuming the new advertisement has not expired, the advertising extension 802 sets the update flag to false (step 850). If the new advertisement has expired, the advertising extension 802 will download a new advertisement before setting the update flag to false (step 850).

The advertising extension 802 sends a message 852 to the developer's application 800 indicating that the update procedure is complete. The developer's application 800 then performs the data communication (step 854) and, upon completion of the data communication, sends a message 856 releasing the progress function, which informs the advertising extension 802 when to stop displaying the new advertisement. The developer's application 800 closes the socket (step 858).

If a call is made to the progress function and the advertising extension determines that the update flag is set to false, the advertising extension may automatically initiate downloading of a new advertisement. Such a situation can occur, for example, if a call to the update function was not made in connection with the most recent display of an advertisement. In some implementations, the update function call may be optional. The update function, however, allows the application developer to control when, during the duration of an open socket, advertisements are downloaded. For example, FIG. 8 illustrates a situation in which the call to the update function is made immediately after creating a socket. However, if the application developer prefers to perform the data communication before allowing a new advertisement to be downloaded, the call to the update function can instead be made after the data communication is complete.

Advertisements may be downloaded using an over the air protocol that may be implemented on top of TCP and HTTP. The protocol may define the format of the communication between a web server (server) and mobile devices (clients). In general, the purpose of the communication is to deliver advertising bitmaps to the clients. After establishing a connection, the client requests a new advertisement and the server will provide a response. The client request may use an HTTP POST method. The HTTP header of the request may contain HTTP header tags along with specially defined header tags for communicating data relevant to the described advertising techniques. The data specifying the necessary format of the requested advertisement may be set forth in request tags, which may be sent in the body of the request. The request tags may HTML format tags. Accordingly, each tag may be separated from its value by an equal sign ('=') and each tag/value pair may be separated by an ampersand ('&'). The response from the server may use the HTTP status technique along with specially defined header tags. The response tags may be in the HTML header, each may appear on its own line and may be separated from its value by a colon (':').

The advertisements that are provided by the server may be "animated" bitmaps, which are essentially a series of bitmaps that are sequentially displayed on the mobile device to simulate animation. Animated bitmaps may be created from a wide bitmap that is divided horizontally into a series of frames, with each frame having the same width (or a "tall" bitmap that is divided vertically into a series of frames). The mobile platform may "play" the frames in a loop to create an animated effect.

A typical request may appear as follows:
POST /adware/adware.asp HTTP/1.0
Host: www.singletouch.net
User-Agent: Adware/1.0
Accept: image/bmp;application/zip
Accept-Language: en-us
Accept-Charset: ISO-8859-1
Content-Type: application/x-www-form-urlencoded
Content-Length: xxx
AW-Title=bk.bmp&AW-Device-Bits=8&AW-Device-Width=120&AW-Device-Depth=144

The request tags of the above illustrative request include an "AW-Title" tag, which allows the client to tell the server which advertisement is in its cache. If the cache is empty, then the "AW-Title" tag may be either blank or missing. An "AW-Device-Bits" tag allows the client to indicate its color depth, which defines how many bits specify each pixel on its screen. The server is free to send an advertisement with the same number or fewer bits per pixel as indicated by the "AW-Device-Bits" tag. An "AW-Device-Width" tag allows the client to indicate the width in pixels of the client's screen. An "AW-Device-Depth" tag allows the client to indicate the height in pixels of the client's screen. An "AW-Device-ID" tag contains a unique identifier for the client device. For example, the client may send its phone number so that requests from the particular client can be uniquely identified.

A typical response may appear as follows:
HTTP/1.1 200 OK
AW-Title: hello.bmp
AW-Frames: 5
AW-Expiration: 200308011403
Content-Type: application/zip—or—
Content-Type: image/bitmap
Content-Length: xxxx
<binary data for bitmap or zip file here>

The first line of the response HTTP header may include a response status indicator, in which a value of "200" indicates that the server is sending a new advertisement to the client; a value of "204" indicates that the server does not have a new advertisement, but may be sending a new expiration time; and a value of "205" indicates that a required tag was missing from the request. There are times when the client will request a new advertisement, but the server will not have one, either because the server does not contain any new advertisements, or because the expiration date of the advertisement in the client's cache has been extended. In either case, the server may indicate with status 204 that there is no new advertisement in the response. The server may also indicate a new expiration time to prevent the client from making unnecessary requests. The new expiration time may either indicate a new expiration time for the advertisement in the client's cache, or a time when the server might have a new advertisement.

The response tags of the above illustrative response include an "AW-Title" tag, which allows the server to inform the client of the advertisement that is sent. An "AW-Frames" tag allows the server to indicate how many frames are in the animated bitmap. Using the information about the number of frames, the client may compute the width of each frame by dividing the width of the received bitmap by the number of frames. An "AW-Expiration" tag indicates that the advertisement is valid only until the time specified in the "AW-Expiration" tag.

Advertisers whose advertisements are distributed from an advertisement server that stores a library of advertisements to client mobile devices may want to require a minimum number of times they expect their advertisement(s) to be viewed along with specifying a time period in which the minimum number of views are to take place. The server that stores advertisements may therefore monitor how many times an advertisement has been viewed. The server may also assign a priority to advertisements for which the minimum requirements have not yet been fulfilled. Such a priority may help ensure that advertisements that need the most views receive a higher proportion of views. When deciding how many views to assign to a particular mobile device, the server may consult a recent history of views for the mobile device.

As discussed above, a mobile device may request a new advertisement when the mobile device does not have an advertisement in the mobile device's advertising cache, when the advertisement has expired, or when the advertisement has been viewed the assigned number of times. To support monitoring functions, when the mobile device requests a new advertisement, the mobile device will inform the server of how many views were accomplished for the current advertisement and in what time period the views occurred. The server may use the received information to update database tables that store statistics about the mobile device and the advertisement.

The server may store a database table for each advertisement. The advertisement database table may include a title, filename, number of frames, rate at which switching between the frames should occur, expiration date (e.g., an "Expiration" field), number of views requested (i.e., by the customer that placed an order for the advertisement to be distributed to mobile devices) (e.g., a "Views_requested" field), number of views that have been assigned to mobile devices but not yet confirmed (e.g., a "Views_assigned" field), and the number of views that have been confirmed (e.g., a "Views_confirmed" field). The expiration date may represent a target date by which time the requested number of views should be completed.

The server may also store a database table for each mobile device. The mobile device database table may include a phone number or other unique identifier for the mobile device, a number of views for the last advertisement assigned to the mobile device as reported by the mobile device (e.g., a "Views" field), a time period in which the views occurred, the title of the last advertisement assigned to the mobile device (e.g., a "Last_assignment_title" field), the number of views assigned for the last advertisement assigned to the mobile device (e.g., a "Last_assignment_views" field), and the time period in which the mobile device is requested to perform the assigned number of views for the last advertisement assigned to the mobile device (e.g., a "Last_assignment_time" field). In some implementations, the mobile device database table may store additional historical information regarding advertisements that were previously assigned to the mobile device to allow the server to more efficiently determine which advertisements should be assigned to the mobile device.

Once the server has updated the database tables, a new advertisement and an associated number of views may be assigned to the mobile device. The new advertisement may be selected randomly and/or may weight advertisements with a higher priority (e.g., a higher number of requested views and/or a shorter time period until expiration) to increase the chances that the higher priority advertisements will be selected. The new advertisement and the assigned number of views may be selected based on the previous view history for the mobile device.

Figure 9:
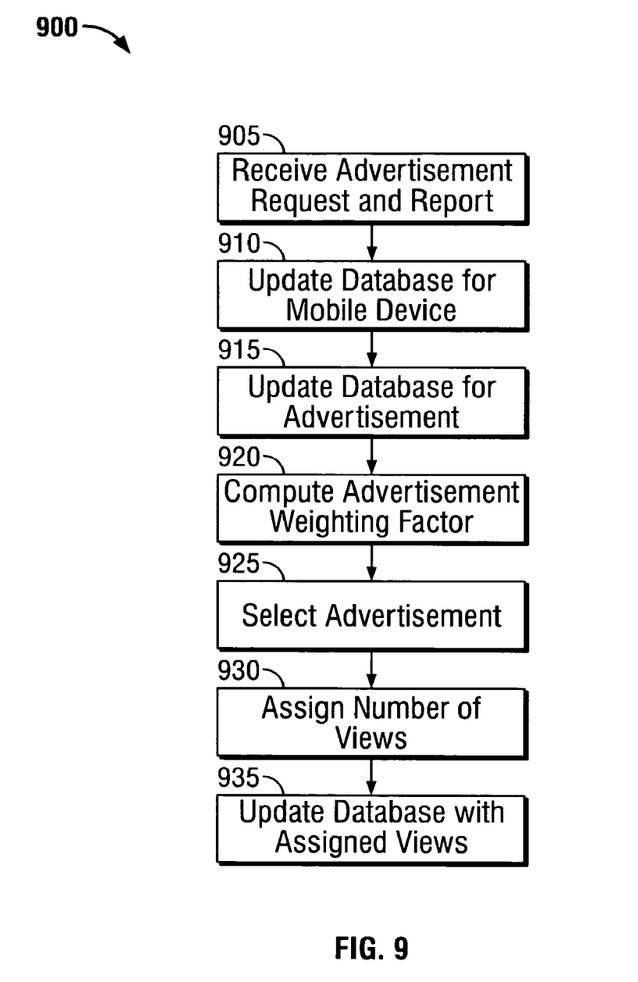
FIG. 9 is a flow diagram of a process for assigning advertisements for display on mobile devices.

FIG. 9 is a flow diagram of a process 900 for assigning advertisements for display on mobile devices. A request for a new advertisement and a report of a number of views that were accomplished for the current advertisement are received from a mobile device (step 905). The request for a new advertisement may be in response to a determination that the mobile device's advertising cache has expired (or is empty), or in response to a determination that the mobile device has finished a view assignment for an advertisement that is currently in the advertising cache. Based on the reported information, the server updates the number of views and time period fields in a database record associated with the mobile device (step 910). The time period may be computed, for example, by subtracting the last assignment time stored in the database record from the current time (e.g., Last_assignment_time_Current_time).

The server also updates the confirmed number of views field in a database record associated with the current advertisement (step 915) by adding the number of views reported by the mobile device to the previous value stored in the confirmed number of views field in the advertisement database record (e.g., Views_confirmed=Views_confirmed+Views). At the same time, the server may also subtract the number of views assigned for the mobile device's last assigned advertisement from the number of views that have been assigned to mobile devices for the advertisement (e.g., Views_assigned=Views_assigned−Last_assignment_views) to update the number of views that are currently assigned but not yet confirmed for the advertisement.

The server may then compute a score for each available advertisement stored in an advertisement database (step 920). The score for each advertisement may be based on the number of views that still need to be assigned and the amount of time left before expiration of the advertisement (e.g., Views_requested−Views_confirmed−Views_assigned/3)/(expiration−Current_time). The scores are used to select an advertisement to be displayed (step 925). In one possible implementation, the score may be highest for advertisements that have the most number of views requested per unit of time remaining before expiration. Such a scoring algorithm will tend to ensure that advertisements reach their requested number of views with the requested time period. A pseudo code example of the selection criteria is as follows:

```
Int sum = 0;
Int I = 0;
For ( I = 0; I < count; I ++ )
{
    scores[i] = compute_score(i);
    sum += scores[i];
}
// rand( ) produces an number between 0 and 2^32-1
// mod produces the remainder after dividing by (sum−1)
// Random is then in the range 0...(sum−1)
Random = rand( ) mod (sum−1);
Int total = 0;
For ( I = 0; I < count; I ++ )
{
    if ( total >= random )
        break;
    total += scores[i];
}
// I is the index of the chosen item
```

After selecting a particular advertisement, a number of views for the particular advertisement is assigned to the mobile device (step 930) based on the view history for the mobile device and based on how much time is left until the advertisement expires. The field that stores the number of views assigned for the new advertisement (e.g., the "Views_assigned" field) is updated (step 935 in accordance with the number of views assigned to the mobile device. Finally, information associated with the particular advertisement is stored in the appropriate fields of the mobile device database table associated with the specific mobile device (e.g., information is stored in the "Last_assignment_title" field, the "Last_assignment_views" field, and the "Last_assignment_time" field).

A number of embodiments have been described. Nevertheless, it will be understood that various modifications may be made. For example, the sequence of steps illustrated in and described in connection with FIGS. 1 and 5-9 may be rearranged. In addition, although applications and advertisements are generally described as being downloaded from one central remote server, applications and advertisements may be downloaded from across a distributed network of servers. Accordingly, other embodiments are within the scope of the following claims.

What is claimed is:

1. A method for advertising on a mobile device, the mobile device including an operating system, the method comprising:
   sending a function call for an advertisement from a first application on the mobile device to an advertising application on the mobile device;
   transmitting, by the advertising application to a server, a request for the advertisement;
   receiving the advertisement by the advertising application;
   storing the advertisement on the mobile device;
   presenting, on the mobile device, the stored advertisement by the first application using the advertising application while downloading a second application and data to be used by the first application, the operating system being separate from and providing an environment for the first and second applications to function;
   determining, at the mobile device, if the stored advertisement has expired; and
   in response to a determination that the stored advertisement has expired, transmitting, by the advertising application to the server, a request for a new advertisement,
   wherein, when the new advertisement is not available, the method further comprises receiving by the advertising application a new expiration criterion from the server and presenting, on the mobile device, the stored advertisement by the first application using the advertising application until expiration of the new expiration criterion.

2. The method of claim 1 further comprising downloading the advertisement to the mobile device over a wireless interface.

3. The method of claim 1 further comprising downloading data needed by the second application.

4. The method of claim 1 wherein the first application comprises a Binary Runtime Environment for Wireless application.

5. The method of claim 1 wherein the second application comprises an application file associated with the second application.

6. The method of claim 1 wherein presenting the advertisement on the mobile device comprises presenting the advertisement during a delay period, the delay period representing a time during which the downloading of the second application and the data used by the first application occurs.

7. The method of claim 1 wherein the determination that the stored advertisement has expired is based on an expiration time.

8. The method of claim 1 wherein the determination that the stored advertisement has expired is based on a number of times the advertisement is presented.

9. The method of claim 1 wherein the determination that the stored advertisement has expired is based on an expiration time and a number of times the advertisement is presented.

10. The method of claim 1 further comprising receiving with the advertisement by the advertising application an initial expiration criterion associated with the advertisement.

11. The method of claim 10 wherein the initial expiration criterion includes at least one of an expiration time and an assigned number of times to present the advertisement.

12. The method of claim 1 wherein the stored advertisement comprises a bitmap.

13. The method of claim 12 wherein the bitmap comprises multiple frames, and presenting the advertisement on the mobile device comprises sequentially displaying the multiple frames.

14. The method of claim 1 further comprising monitoring at least one of a number of times the stored advertisement is presented and a frequency that the stored advertisement is presented.

15. The method of claim 1, wherein the new advertisement is an update to the stored advertisement.

16. The method of claim 1, wherein the advertising application is implemented as software code that can be called by the first and second applications and applications other than the first and second applications to perform one or more tasks.

17. The method of claim 16, wherein the software code is implemented as an extension.

18. The method of claim 17, wherein the extension is a BREW extension.

19. An article comprising a non-transitory machine-readable medium storing instructions for causing one or more processors to perform operations comprising:
   sending a function call for an advertisement from a first application on a mobile device to an advertising application on the mobile device;
   transmitting, by the advertising application to a server, a request for the advertisement;
   receiving the advertisement by the advertising application;
   presenting, on the mobile device, the stored advertisement by the first application using the advertising application while downloading a second application and data used by the first application, the operating system being separate from and providing an environment for the first and second applications to function;
   determining, at the mobile device, if the stored advertisement has expired based on expiration data associated with the advertisement; and
   in response to a determination that the stored advertisement has expired, transmitting, by the advertising application to the server, a request for new expiration data for the stored advertisement.

20. The article of claim 19 wherein the expiration data relates to one of a number of times the advertisement is presented and an expiration time.

21. The article of claim 19 wherein the data used by the first application is received by the first application during a wireless data communication.

22. The article of claim 21 wherein the first application initiates the wireless data communication.

23. The article of claim 22 wherein the wireless data communication involves data needed by the first application to perform an operation requested by a user of the mobile device.

24. The article of claim 22 wherein the first application runs on a Binary Runtime Environment for Wireless platform.

25. The article of claim 19 wherein the non-transitory machine-readable medium further stores instructions for causing one or more processors to perform operations comprising maintaining statistical data relating to the advertisement.

26. The article of claim 19, wherein the new advertisement is an update to the stored advertisement.

27. The article of claim 19, wherein the advertising application is implemented as software code that can be called by the first and second applications and applications other than the first and second applications to perform one or more tasks.

28. The article of claim 27, wherein the software code is implemented as an extension.

29. The article of claim 28, wherein the extension is a BREW extension.

30. A communications system comprising:
a central advertising server comprising a processor in communication with a wireless telecommunication network to store advertisements for presentation on a mobile device by a first application using an advertising application, the first application and the advertising application running on the mobile device, and to download a second application and data used by the first application to the mobile device during a period of delay, the mobile device including an operating system that is separate from and provides an environment for the first and second applications to function, wherein the central advertising server operates to:
receive a request for a new advertisement from the advertising application;
determine whether at least one of the stored advertisements is available for transmission to the mobile device;
transmit a selected one of the stored advertisements to the mobile device if the selected one of the stored advertisements is available for transmission to the mobile device;
transmit to the mobile device, together with the transmission of the selected one of the stored advertisements, an initial expiration criterion associated with the selected one of the stored advertisements for use by the mobile device to determine if the selected one of the stored advertisements, when stored on the mobile device, has expired;
determine a new expiration criterion for the selected one of the stored advertisements; and
transmit to the mobile device the new expiration criterion for the selected one of the stored advertisements.

31. The communications system of claim 30 wherein the central advertising server operates to track statistics relating to the stored advertisements.

32. The communications system of claim 31 wherein the statistics relating to the stored advertisements include at least one of a number of times the advertisements have been presented, a number of presentations that have been assigned, a number of requested presentations for each advertisement, and an expiration time for each advertisement.

33. The communications system of claim 30 wherein the initial expiration criteria includes a number of presentations for the selected advertisement.

34. The communications system of claim 30 wherein the initial expiration criteria includes an expiration time.

35. The communications system of claim 30 wherein the central advertising server selects the selected advertisement according to a priority weighting procedure.

36. The communications system of claim 35 wherein the priority weighting procedure relates to at least one of a remaining number of requested presentations for the selected advertisement and a time remaining until an expiration time for the selected advertisement.

37. The communication system of claim 30, wherein the advertising application is implemented as software code that can be called by the first and second applications and applications other than the first and second applications to perform one or more tasks.

38. The communication system of claim 37, wherein the software code is implemented as an extension.

39. The communication system of claim 38, wherein the extension is a BREW extension.

40. A method of advertising on a mobile device, the mobile device including an operating system, the method comprising:
sending a function call for an advertisement from a first application on the mobile device to an advertising application on the mobile device;
transmitting, by the advertising application to a server, a request for the advertisement;
receiving the advertisement by the advertising application;
storing the advertisement on the mobile device;
presenting, on the mobile device, the stored advertisement by the first application using the advertising application while downloading a second application and data used by the first application to the mobile device during a period of delay, the operating system being separate from and providing an environment for the first an second applications to function;
determining, at the mobile device, if the stored advertisement has expired based on an initial expiration criterion;
in response to a determination that the stored advertisement has expired, transmitting, by the advertising application to the server, a request for a new advertisement;
if the new advertisement is not available, receiving at the mobile device from the server a new expiration criterion; and
determining, at the mobile device, if the stored advertisement has expired based on the new expiration criterion.

41. The method of claim 40 further comprising downloading the advertisement to the mobile device over a wireless interface.

42. The method of claim 40 wherein the period of delay comprises a time during which a download of the second application and the data used by the first application occurs.

43. The method of claim 40 wherein the initial expiration criterion is an expiration time.

44. The method of claim 40 wherein the initial expiration criterion is a number of times the stored advertisement is presented.

45. The method of claim 40 wherein the initial expiration criterion is a combination of an expiration time and a number of times the stored advertisement is presented.

46. The method of claim 40 wherein the new advertisement is an update to the stored advertisement.

47. The method of claim 40, wherein the advertising application is implemented as software code that can be called by the first and second applications and applications other than the first and second applications to perform one or more tasks.

48. The method of claim 47, wherein the software code is implemented as an extension.

49. The method of claim 48, wherein the extension is a BREW extension.

50. A system, comprising:
a mobile device including an operating system and at least one processor to:

send a function call from a first application on the mobile device to an advertising application on the mobile device;

responsive to the function call, transmit, by the advertising application to a server, a request for an advertisement;

receive the advertisement by the advertising application;

store the advertisement on the mobile device;

present, on the mobile device, the stored advertisement by the first application using the advertising application while downloading a second application and data to be used by the first application, the operating system being separate from and providing an environment for the first and second applications to function;

determining, at the mobile device, if the stored advertisement has expired based on an initial expiration criterion;

in response to a determination that the stored advertisement has expired, transmitting, by the advertising application to the server, a request for a new advertisement;

if the new advertisement is not available, receiving at the mobile device from the server a new expiration criterion; and determining, at the mobile device, if the stored advertisement has expired based on the new expiration criterion.

51. The system of claim 50, the at least one processor further to download the advertisement to the mobile device over a wireless interface.

52. The system of claim 50, the at least one processor further to download to the mobile device data to be used by the second application.

53. The system of claim 50, wherein the first application comprises a Binary Runtime Environment for Wireless application.

54. The system of claim 50, wherein the application data used by the first application comprises an application file associated with the first application.

55. The system of claim 50, wherein presenting the advertisement on the mobile device comprises presenting the advertisement during a delay period, the delay period representing a time during which the download of the second application and the data used by the first application occurs.

56. The system of claim 50, wherein the initial expiration criterion is an expiration time.

57. The system of claim 50, the at least one processor further to monitor at least one of a number of times the stored advertisement is presented and a frequency that the stored advertisement is presented.

58. The system of claim 50, wherein the new advertisement is an update to the stored advertisement.

59. The system of claim 50, wherein the advertising application is implemented as software code that can be called by the first and second applications and applications other than the first and second applications to perform one or more tasks.

60. The system of claim 59, wherein the software code is implemented as an extension.

61. The system of claim 60, wherein the extension is a BREW extension.

* * * * *